(12) United States Patent
Suzuki et al.

(10) Patent No.: US 12,216,531 B2
(45) Date of Patent: Feb. 4, 2025

(54) EARLY ABNORMALITY DETECTION BASED ON FREQUENCY-INVERSE DOCUMENT FREQUENCY VECTORS CREATED USING EVENT LOGS

(71) Applicant: NEC Platforms, Ltd., Kawasaki (JP)

(72) Inventors: Ryo Suzuki, Kanagawa (JP); Ken Tonari, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 79 days.

(21) Appl. No.: 18/103,891

(22) Filed: Jan. 31, 2023

(65) Prior Publication Data
US 2023/0267029 A1    Aug. 24, 2023

(30) Foreign Application Priority Data
Feb. 21, 2022   (JP) ................................ 2022-024449

(51) Int. Cl.
*G06F 11/34*   (2006.01)
*G06F 11/07*   (2006.01)

(52) U.S. Cl.
CPC ........ *G06F 11/079* (2013.01); *G06F 11/0721* (2013.01)

(58) Field of Classification Search
CPC .............. G06F 11/0721; G06F 11/079; G06F 11/0709; G06F 11/3466; G06F 11/3476
See application file for complete search history.

(56) References Cited

U.S. PATENT DOCUMENTS

| 9,612,897 B1 * | 4/2017 | Bernico ................. G06N 20/00 |
| 11,935,646 B1 * | 3/2024 | Guller ..................... G06N 7/01 |

(Continued)

FOREIGN PATENT DOCUMENTS

| CN | 114048870 A | 2/2022 |
| JP | 2015-130136 A | 7/2015 |

(Continued)

OTHER PUBLICATIONS

LogEvent2vec: LogEvent-to-Vector Based Anomaly Detection for Large-Scale Logs in Internet of Things by Wang, Jin Sensors20.9: 2451. MDPI AG. (2020) https://dialog.proquest.com/professional/cv_2188612/docview/2396609744/fulltextPDF/18F6658ADFB2A3F7F05/2?accountid=131444 (Year: 2020).*

(Continued)

*Primary Examiner* — Joseph O Schell

(57) ABSTRACT

A learning unit of an operation management system extracts, according to performance information and event logs of a device to be managed, a first abnormality occurrence period using the performance information, calculates a first TF-IDF vector created using event logs in the first abnormality occurrence period, and stores at least the first TF-IDF vector as a learning model. A recommendation section calculates, using the performance information and event logs newly acquired by the device, a second abnormality occurrence period and a second TF-IDF vector, calculates a first degree of similarity between the first TF-IDF vector in the learning model and the second TF-IDF vector, and outputs recommendation information regarding the calculated second abnormality occurrence period when the first degree of similarity is equal to or less than a predetermined value.

10 Claims, 11 Drawing Sheets

(56) References Cited

U.S. PATENT DOCUMENTS

| | | | |
|---|---|---|---|
| 2016/0196174 A1* | 7/2016 | Jacob | G06F 11/079 714/37 |
| 2016/0335260 A1* | 11/2016 | Convertino | G06F 16/2358 |
| 2019/0258725 A1* | 8/2019 | Parthasarathy | G06F 16/3347 |
| 2020/0045049 A1* | 2/2020 | Apostolopoulos | G06N 7/00 |
| 2024/0250886 A1* | 7/2024 | Eng | H04L 43/04 |

FOREIGN PATENT DOCUMENTS

| | | |
|---|---|---|
| JP | 2016-012193 A | 1/2016 |
| JP | 2018-533897 A | 11/2018 |
| WO | 2010/032701 A1 | 3/2010 |
| WO | 2016/129093 A1 | 8/2016 |
| WO | 2017/115458 A1 | 7/2017 |

OTHER PUBLICATIONS

Automated IT System Failure Prediction: A Deep Learning Approach by Ke Zhang 2016 IEEE International Conference on Big Data (Big Data) https://ieeexplore.ieee.org/stamp/stamp.jsp?arnumber=7840733 (Year: 2016).*

A Text-Driven Aircraft Fault Diagnosis Model Based on a Word2vec by Xu, Zhenzhong Aerospace8.4: 112. MDPI AG. (2021) https://dialog.proquest.com/professional/cv_2188612/docview/2528291190/18F6658ADFB2A3F7F05/1?accountid=131444 (Year: 2021).*

"A Text-Driven Aircraft Fault Diagnosis Model Based on a Word2vec and Priori-Knowledge Convolutional Neural Network" by Xu Published Apr. 14, 2021; MDPI https://dialog.proquest.com/professional/cv_2188612/docview/2528291190/191D384A9C66CC3883/1?accountid=131444 (Year: 2021).*

Japanese Office Action for JP Application No. 2022-024449, mailed on Apr. 18, 2023 with English Translation.

* cited by examiner

EARLY ABNORMALITY DETECTION BASED ON FREQUENCY-INVERSE DOCUMENT FREQUENCY VECTORS CREATED USING EVENT LOGS

Priority is claimed on Japanese Patent Application No. 2022-024449, filed Feb. 21, 2022, the content of which is incorporated herein by reference.

TECHNICAL FIELD

The present disclosure relates to an operation management system, an operation management method and a storage medium.

BACKGROUND ART

A service that monitors a system operating on a user side and, when an abnormality is detected in the system, notifies a system manager or the like on the user side of the occurrence of the abnormality is performed. As a method of detecting the occurrence of an abnormality in the system, there is a method of detecting it by analyzing an occurrence status of an event log of an event that occurs in the system and the content of the event log. When a system abnormality is detected, a cause of the abnormality is estimated based on information such as a configuration and performance of a system.

Japanese Unexamined Patent Application, First Publication No. 2016-012193 discloses a device that monitors a system by extracting different types of information, such as information indicating the configuration of a system to be monitored, information indicating the performance, and an event log, in association with an abnormality that has occurred in a processing unit.

SUMMARY

Incidentally, when a system operated on a user side is monitored, in the system operation management of an information processing system, an information processing device, software, or configuration elements of these, not only simple extraction of an abnormality, but also early detection of an event with a possibility of an abnormality, that is, a possibility of an incident, is desired.

In order to solve the problems described above, an example object of the present disclosure is to provide an operation management system, an operation management method and a storage medium.

According to a first example aspect of the present disclosure, an operation management system includes a memory configured to store instructions, and a processor configured to execute the instructions to extract, according to performance information and event logs of a device to be managed, a first abnormality occurrence period using the performance information, calculate a first term frequency-inverse document frequency vector created using event logs in the first abnormality occurrence period, and store at least the first term frequency-inverse document frequency vector as a learning model, and calculate, using the performance information and event logs newly acquired by the device, a second abnormality occurrence period and a second term frequency-inverse document frequency vector, calculate a first degree of similarity between the first term frequency-inverse document frequency vector in the learning model and the second term frequency-inverse document frequency vector, and output recommendation information regarding the calculated second abnormality occurrence period when the first degree of similarity is equal to or less than a predetermined value.

In addition, according to a second example aspect of the present disclosure, an operation management method includes extracting, according to performance information and event logs of a device to be managed, a first abnormality occurrence period using the performance information, calculating a first term frequency-inverse document frequency vector created using event logs in the first abnormality occurrence period, and storing at least the first term frequency-inverse document frequency vector as a learning model, and calculating, using the performance information and event logs newly acquired by the device, a second abnormality occurrence period and a second term frequency-inverse document frequency vector, calculating a first degree of similarity between the first term frequency-inverse document frequency vector in the learning model and the second term frequency-inverse document frequency vector, and outputting recommendation information regarding the calculated second abnormality occurrence period when the first degree of similarity is equal to or less than a predetermined value.

Moreover, according to a third example aspect of the present disclosure, a non-transitory computer-readable storage medium has recorded an operation management computer program for causing a computer to execute extracting, according to performance information and event logs of a device to be managed, a first abnormality occurrence period using the performance information, calculating a first term frequency-inverse document frequency vector created using event logs in the first abnormality occurrence period, and storing at least the first term frequency-inverse document frequency vector as a learning model, and calculating, using the performance information and event logs newly acquired by the device, a second abnormality occurrence period and a second term frequency-inverse document frequency vector, calculating a first degree of similarity between the first term frequency-inverse document frequency vector in the learning model and the second term frequency-inverse document frequency vector, and outputting recommendation information regarding the calculated second abnormality occurrence period when the first degree of similarity is equal to or less than a predetermined value.

According to the present disclosure, an effect that an event with a possibility of an abnormality, that is, a possibility of an incident, can be detected in an apparatus to be monitored is achieved.

EXAMPLE EMBODIMENT

Figure 1:
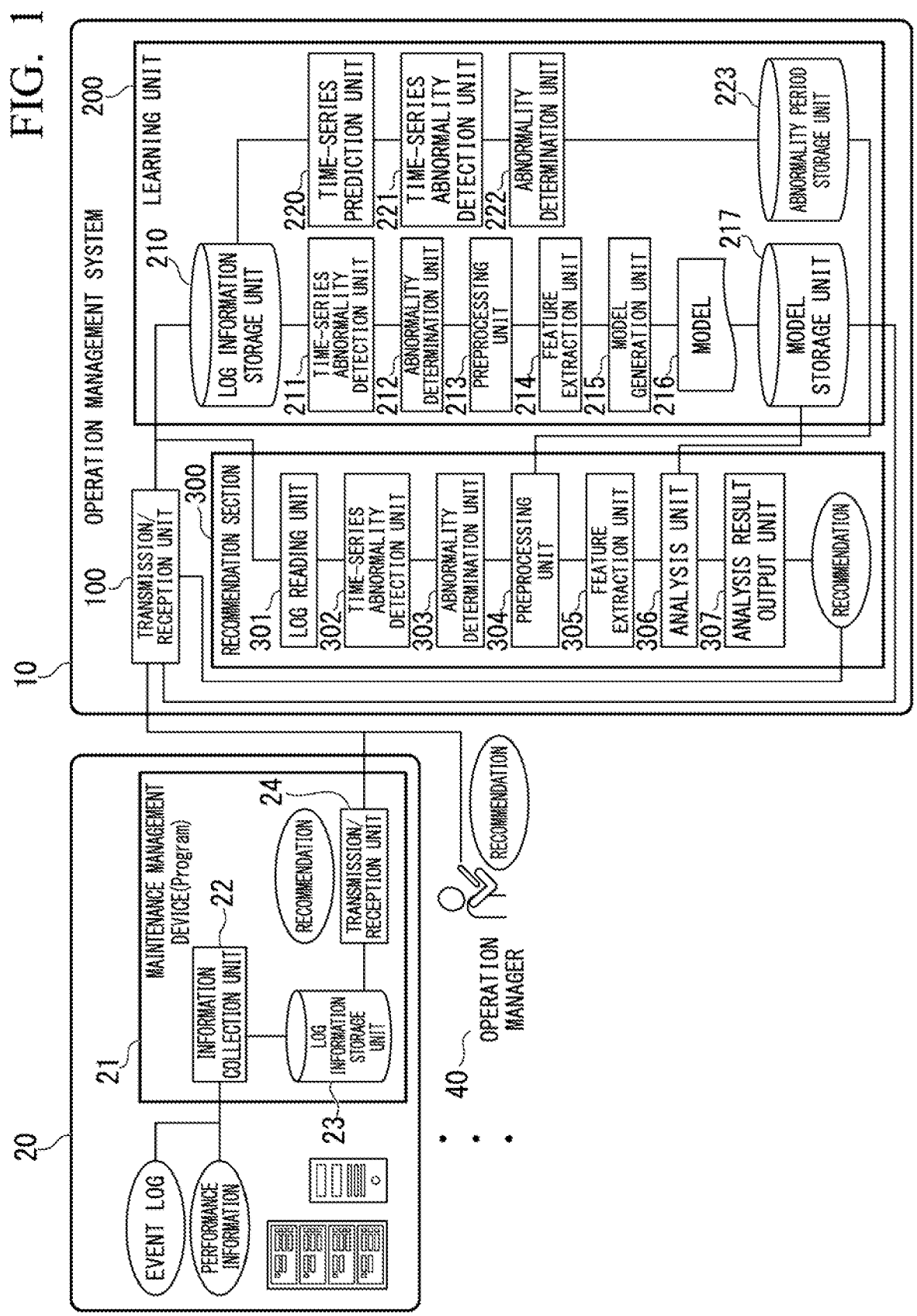
FIG. 1 is a block diagram which shows a configuration of an operation management system according to one example embodiment of the present disclosure.

Hereinafter, an operation management system according to an example embodiment of the present disclosure will be described with reference to the drawings. FIG. 1 is a block diagram which shows a configuration of the operation management system 10. As shown in FIG. 1, in addition to the operation management system 10, a site 20 provided with a device to be operated and monitored is shown. The operation management system 10 includes a transmission/reception unit 100, a learning unit 200, and a recommendation section 300. In addition, the site 20 is also provided with a maintenance management device 21 that collects information necessary for monitoring, and the maintenance management device 21 includes an information collection unit 22, a log information storage unit 23, and a transmission/reception unit 24.

First, functions of each processing unit of the maintenance management device 21 will be described. The information collection unit 22 periodically collects information necessary for monitoring from the device to be monitored. The log information storage unit 23 stores the information collected by the information collection unit 22. The transmission/reception unit 24 transmits the collected information to the operation management system 10 after the storage for a certain period of time. In addition, the transmission/reception unit 24 receives recommendation information, which is a result of monitoring from the operation management system 10. The information necessary for monitoring is performance information or an event log that is obtained from an information processing device that constitutes a device to be monitored, software, or components of these. In addition, although an example in which the log information storage unit 23 stores information necessary for monitoring has been described, it may also transmit the information necessary for monitoring to the operation management system 10 directly by the transmission/reception unit 24 at any time without storing it. Although the operation management system 10 transmits the recommendation information to the transmission/reception unit 24 (or the site 20), it may also transmit the recommendation information to a terminal 40 of an operation manager of the site 20. In this case, the operation manager who owns the terminal 40 can check the recommendation result at any place. Moreover, although the maintenance management device 21 is described as an independent device, each function may be provided as a program.

Next, the functions of each processing unit that constitutes the operation management system 10 will be described. The transmission/reception unit 100 of the operation management system 10 receives information such as performance information and an event log transmitted from the site 20 where the device to be monitored is. In addition, the transmission/reception unit 100 transmits the recommendation information, which is the monitoring result, to the site 20 and the terminal 40. The learning unit 200 constituting the operation management system 10 includes a log information storage unit 210, a time-series abnormality detection unit 211, an abnormality determination unit 212, a preprocessing unit 213, a feature extraction unit 214, a model generation unit 215, a model storage unit 217, a time-series prediction unit 220, a time-series abnormality detection unit 221, an abnormality determination unit 222, and an abnormality period storage unit 223. A recommendation section 300 that constitutes the operation management system 10 includes a log reading unit 301, a time-series abnormality detection unit 302, an abnormality determination unit 303, a preprocessing unit 304, a feature extraction unit 305, an analysis unit 306, and an analysis result output unit 307.

The learning unit 200 records the performance information and the event log received from the site 20 by the transmission/reception unit 100 in the log information storage unit 210. The learning unit 200 also acquires the performance information and the event log recorded from the log information storage unit 210. The time-series abnormality detection unit 211 applies a time-series data abnormality detection algorithm to the acquired performance information to acquire an abnormality index. The abnormality determination unit 212 determines whether the abnormality index exceeds an abnormality threshold value. Moreover, when the abnormality threshold value is exceeded, the abnormality determination unit 212 extracts an abnormality occurrence period between a start time and an end time including a period during which the abnormality index exceeds the abnormality threshold value, and assigns the index to the abnormality occurrence period. Here, the index is data specifying the extracted abnormality occurrence period, and may include data indicating characteristics of the abnormality occurrence period. The preprocessing unit 213 extracts event logs of the abnormality occurrence period, applies a morphological analysis to the extracted event logs, and divides the extracted event logs into vocabularies for each part of speech and each number representing an error. The feature extraction unit 214 calculates a TF-IDF vector from part or all of the division described above. Here, "TF-IDF" (term frequency-inverse document frequency) is an index term frequency/inverse document frequency, and is a value obtained using the frequency and importance of words in the information divided as vocabulary. "TF-IDF vector" is a vector obtained using this value. The model generation unit 215 records the abnormality occurrence period/index/TF-IDF vector in the model storage unit 217 as a learning model 216.

The time-series prediction unit 220 applies a time-series predicting algorithm for time-series data to the read performance information, and acquires prediction results regarding changes in performance information. The time-series abnormality detection unit 221 applies a time-series data abnormality detection algorithm to the prediction result and acquires an abnormality index. The abnormality determination unit 222 determines whether the abnormality index exceeds the abnormality threshold value. In addition, when the abnormality threshold value is exceeded, the abnormality determination unit 222 extracts the abnormality occurrence period as the start time and the end time of a period including the period during which the abnormality index exceeds the abnormality threshold value, and records the extracted abnormality occurrence period in the abnormality period storage unit 223 by assigning it an index.

The recommendation section 300 includes a function of executing a first recommendation method and a function of executing a second recommendation method. The recommendation section 300 has a function of realizing two recommendation methods, and realizes recommendations for detected abnormalities and a possibility of abnormalities by combining respective recommendation information.

Functions related to the first recommendation method in the recommendation section 300 will be described. A log reading unit 301 of the recommendation section 300 acquires new performance information and event log that are received. The time-series abnormality detection unit 302, the abnormality determination unit 303, the preprocessing unit 304, and the feature extraction unit 305 perform the same operations as the time-series abnormality detection unit 211, the abnormality determination unit 212, the preprocessing unit 213, and the feature extraction unit 214 of the learning unit 200, respectively. That is, these processing units calculate abnormality detection and an abnormality occurrence period using the performance information and event log newly acquired by the log reading unit 301, and calculate a TF-IDF vector of the event log in the new abnormality occurrence period. Specifically, the time-series abnormality detection unit 302 applies a time-series data abnormality detection algorithm to the newly acquired performance information and acquires an abnormality index. The abnormality determination unit 303 determines whether the abnormality index exceeds the abnormality threshold value. In addition, when the abnormality index exceeds the abnormality threshold value, the abnormality determination unit 303 extracts an abnormality occurrence period as the start time and the end time including a period during which the abnormality index exceeded the abnormality threshold value, and assigns an index thereto. The preprocessing unit 304 extracts the event logs of the abnormality occurrence period, applies the morphological analysis to the extracted event logs, and divides the extracted event logs into vocabularies for each part of speech and each number representing an error. The feature extraction unit 305 calculates TF-IDF vectors based on a part or all of the division.

Next, the analysis unit 306 reads the learning model 216 created at the time of learning from the model storage unit 217, and calculates a degree of similarity between the TF-IDF vector read from the learning model 216 and a TF-IDF vector of the event logs in the new abnormality occurrence period obtained by the feature extraction unit 305 in a method such as cosine similarity. Moreover, the analysis unit 306 acquires index information from the TF-IDF vector having a high degree of similarity with that of the learning model 216, and generates the similarity result as recommendation information. In addition, when the TF-IDF vector from the learning model 216 and the TF-IDF vector obtained by the feature extraction unit 305 have a low degree of similarity, the analysis unit 306 extracts event logs corresponding to the abnormality occurrence period obtained by the abnormality determination unit 303, and generates recommendation information 1, such as a possibility that a new event has occurred.

In addition, the analysis unit 306 extracts an abnormality occurrence period of the past index information with a high degree of similarity in the past, and calculates a time difference in the abnormality occurrence period. The analysis unit 306 determines whether each time difference has regularity, and when there is regularity, it determines whether there is a break of the regularity. Then, the analysis unit 306 additionally updates the recommendation information 1 with, for example, execution omissions or processing delays in a regular operation when there is a break of the regularity.

Functions related to the second recommendation method in the recommendation section 300 will be described. The operations of the log reading unit 301, the time-series abnormality detection unit 302, the abnormality determination unit 303, the preprocessing unit 304, and the feature extraction unit 305 are the same as those in the first recommendation method. The analysis unit 306 calculates the degree of similarity based on predicted TF-IDF vectors of each of current and predicted event logs. Since the TF-IDF vector of the current event log has already been acquired by the feature extraction unit 305, the analysis unit 306 acquires the TF-IDF vector of the predicted event log, and calculates a degree of similarity based on the TF-IDF vectors of the current and predicted event logs. In addition, the analysis unit 306 may use the preprocessing unit 304 and the feature extraction unit 305 to acquire the TF-IDF vector of event logs corresponding to the abnormality occurrence period in prediction. The analysis unit 306 acquires corresponding event log information in combination with similarity results for those with a high degree of similarity, and generates recommendation information 2 that implies that there may have been a change in an execution timing of these events. When the obtained degree of similarity is low, the analysis unit 306 extracts non-similar event logs, and generates the recommendation information 2 that implies whether there is any influence on business processing due to an occurrence of a new event.

An analysis result output unit 307 in the recommendation section 300 combines the recommendation information 1 and the recommendation information 2 and outputs the combination as a recommendation result. The operation management system 10 transmits the output recommendation result to the site 20 or the terminal 40.

In addition, the operation manager who has received the transmitted recommendation result checks the recommendation result. In addition, the operation manager determines whether there is any influence or problem occurring in the system operation during a period displayed in the recommendation result, uses the result as feedback information, and sends it to the operation management system 10 via a predetermined terminal in the site 20 or the terminal 40.

The operation management system 10 registers information called "abnormal" for a learning model stored in the model storage unit 217 when the received feedback information indicates that there has been some influence or problems. On the other hand, the operation management system 10 registers information called "normal" for the learning model stored in the model storage unit 217 when the feedback information indicates that there has been no problem.

The above is a description of the functions of the processing units that constitute the operation management system 10. The operation management system 10 may be configured as a virtual server on a cloud instead of a physical server.

Figure 2:
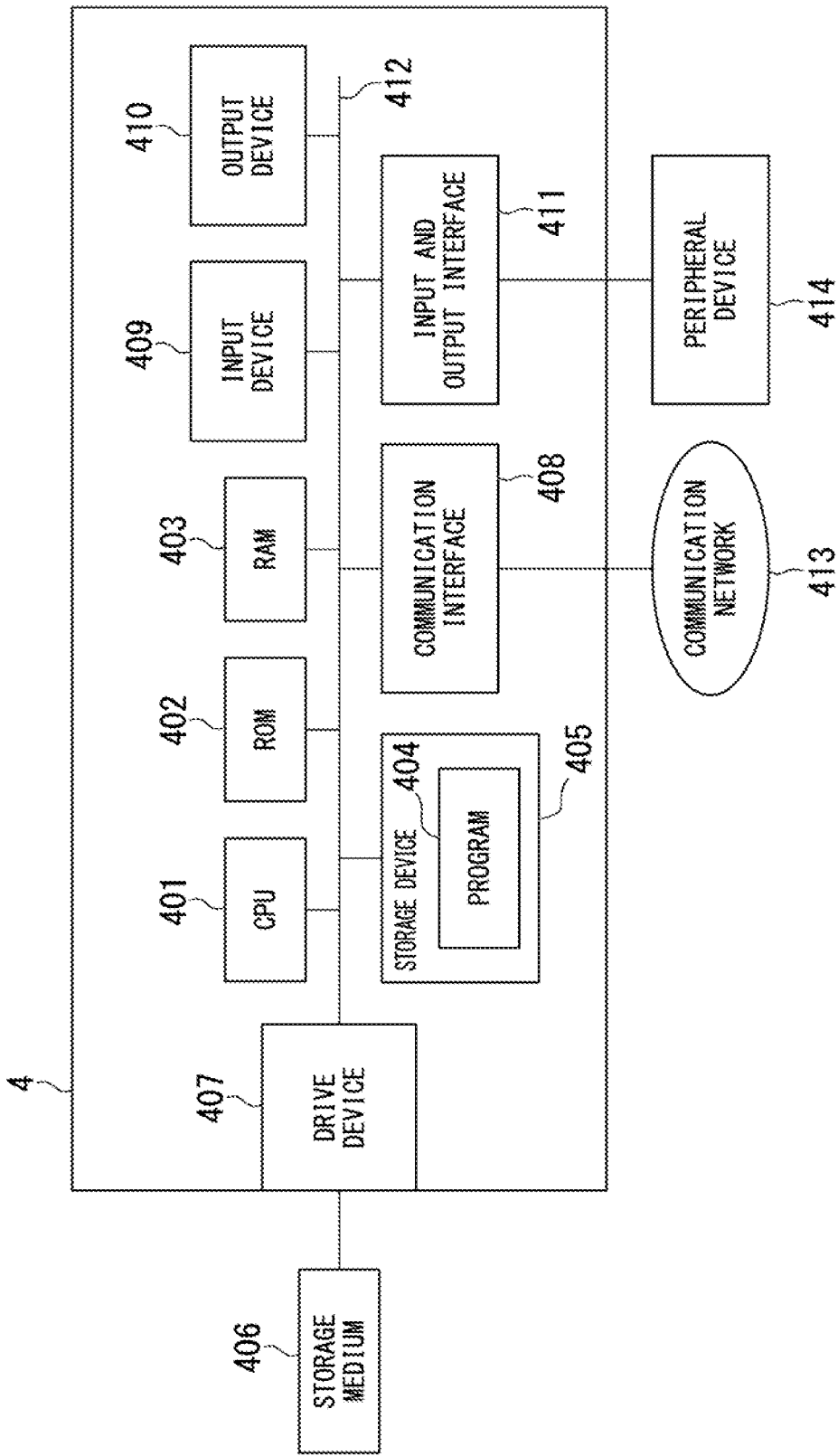
FIG. 2 is a diagram which shows an example of a hardware configuration for realizing the operation management system according to one example embodiment of the present disclosure using a computer device including a processor.

FIG. 2 is a diagram which shows an example of a hardware configuration that realizes the operation management system 10 of the present disclosure using a computer device 4 including a processor. As shown in FIG. 2, the computer device 4 includes a memory such as a central processing unit (CPU) 401, a read only memory (ROM) 402, and a random access memory (RAM) 403, and a storage device 405 such as a hard disk for storing a program 404. Furthermore, the computer device 4 includes a communication interface (I/F) 408 for connection to a communication network 413 and an input/output interface 411 for inputting or outputting data to or from a peripheral device 414. In addition, the computer device 4 connects each device constituting the computer device 4 to an input device 409 and an output device 410 provided inside or outside the computer device 4 via a bus 412.

The CPU 401 operates the operating system to control an entire computer device 4 that realizes the operation management system 10. In addition, the CPU 401 reads, for example, programs and data from a storage medium 406 mounted on a drive device 407 or the like. Moreover, the CPU 401 functions as the learning unit 200 and the recommendation section 300 shown in FIG. 1, and executes processing or instructions in flowcharts shown in FIGS. 3 to 6 to be described below on the basis of the program.

The storage medium 406 is, for example, an optical disc, a flexible disk, a magnetic optical disc, an external hard disk, or a semiconductor memory. Some storage mediums are non-volatile storage devices on which programs are recorded. In addition, the program may be downloaded from an external computer (not shown) connected to a communication network.

The input device 409 is realized by, for example, a mouse, a keyboard, an embedded key button, or the like, and is used for input operations. The input device 409 is not limited to a mouse, a keyboard, or an embedded key button, and may be, for example, a touch panel. The output device 410 is realized by, for example, a display, and used to check an output. In the present example embodiment, the operation management system 10 starts processing when it detects a reception of a necessary operation for product design from the input device 409 by a user.

As described above, the operation management system 10 shown in FIG. 1 is realized by a computer and hardware shown in FIG. 2. However, a realization means of each part included in the operation management system 10 of FIG. 1 is not limited to the constituents described above. Moreover, the operation management system 10 may be realized by one physically connected device, or may be realized by two or more physically separated devices connected by wire or wirelessly. For example, the input device 409 and the output device 410 may be connected to the computer device 4 via a network. In addition, the storage device 405 stores various types of information necessary for design support as the log information storage unit 210, the model storage unit 217, and the abnormality period storage unit 223 shown in FIG. 1.

Next, an operation of the operation management system 10 will be described in detail with reference to FIGS. 3 to 11.

The maintenance management device 21 of FIG. 1 periodically collects performance information and event logs of a device to be monitored within the site 20. In addition, the maintenance management device 21 transmits periodically collected information to the operation management system 10 via the network. The transmission/reception unit 100 of the operation management system receives the transmitted performance information and event logs and stores them in the log information storage unit 210.

Figure 3:
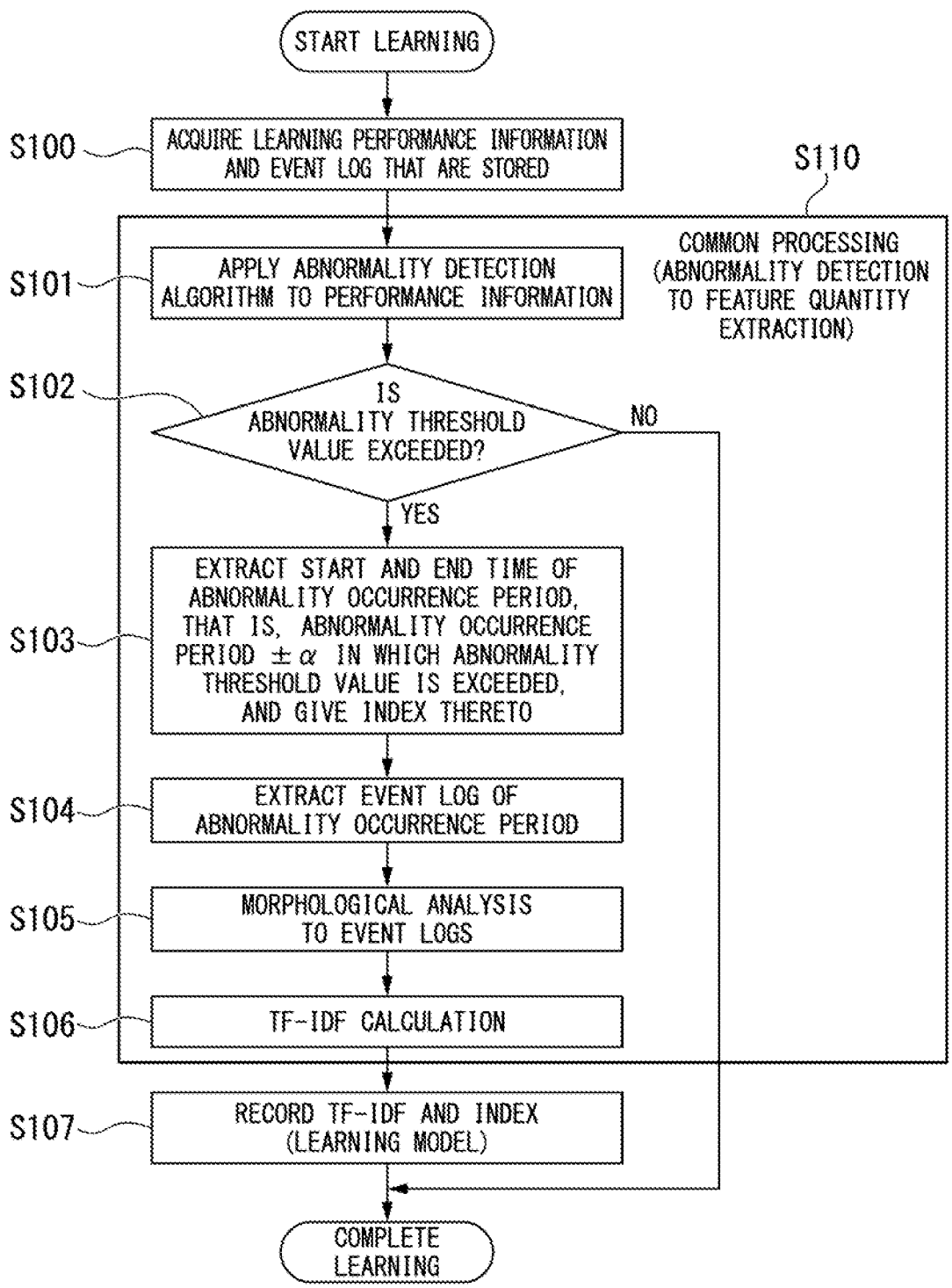
FIG. 3 is a flowchart which shows an example of an operation in a first learning method of the operation management system according to one example embodiment of the present disclosure.

An operation of the learning unit 200 for the first learning method performed by the operation management system 10 will be described using FIG. 3. The learning unit 200 acquires the performance information and event logs received from the maintenance management device 21 from the log information storage unit 210 (S100). The time-series abnormality detection unit 211 applies a time-series data abnormality detection algorithm to the acquired performance information and acquires an abnormality index shown in time series (S101). Here, the time-series data abnormality detection algorithm includes algorithms such as Change Finder, a singular spectrum transformation, a neighborhood method, and One-Class SVM.

Figure 7:
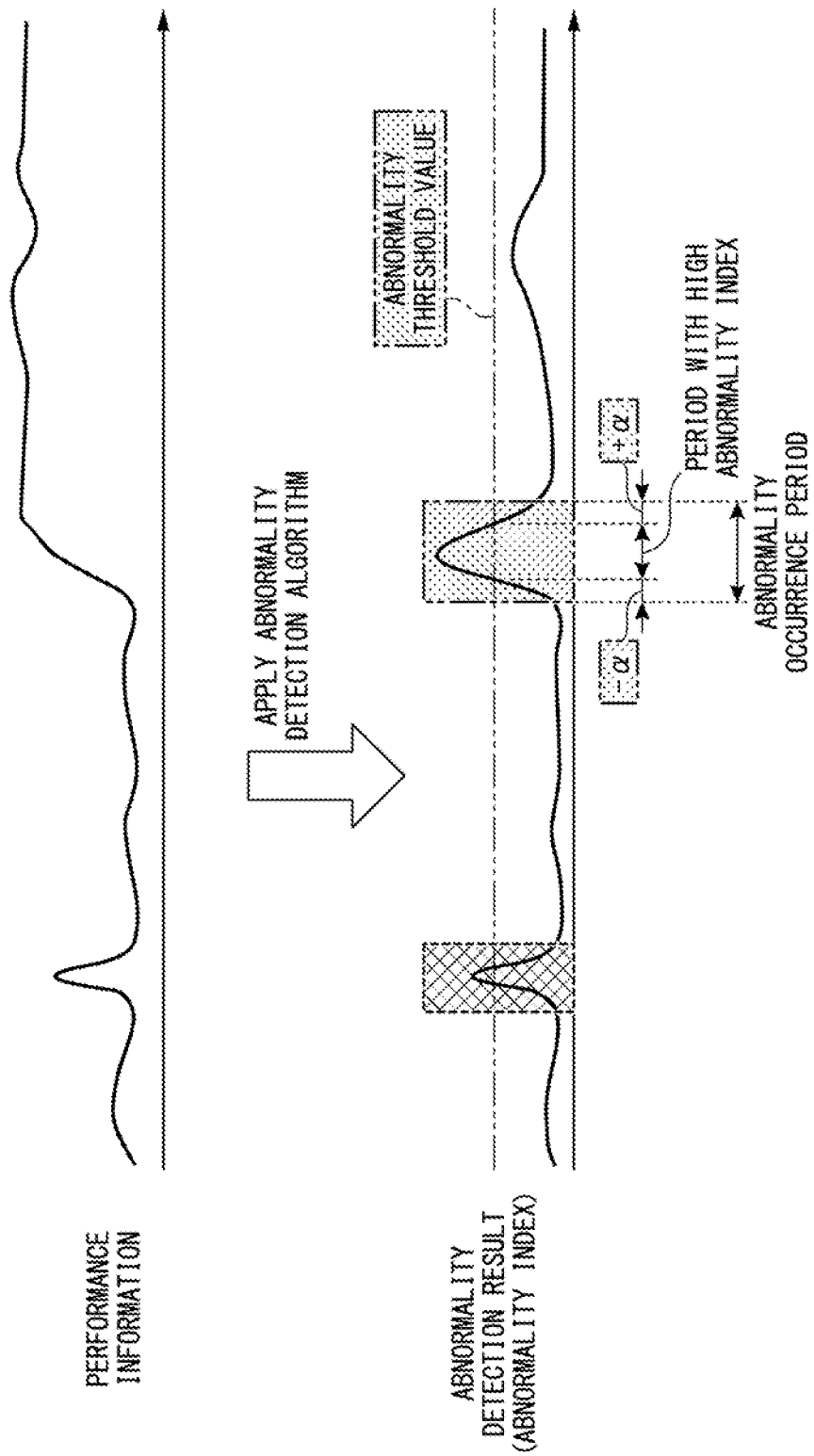
FIG. 7 is a diagram which shows an image of extraction of an abnormality occurrence period by the operation management system according to one example embodiment of the present disclosure.

The abnormality determination unit 212 determines whether the abnormality index exceeds the abnormality threshold value (S102). It is assumed that the abnormality threshold value be a preset value. The abnormality determination unit 212 extracts an abnormality occurrence period by using a period including a period in which the abnormality index exceeding the abnormality threshold value occurs as the start time and the end time, and assigns an index to the abnormality occurrence period (S103) when the abnormality index shown in time series exceeds the abnormality threshold value (Yes in S102). Here, the abnormality occurrence period is a slightly wider period than the period in which the abnormality index exceeding the abnormality threshold value occurs, and may also be, for example, a period having a width of a with respect to each of the start time and the end time of the period in which the abnormality index exceeds the abnormality threshold value. FIG. 7 is a diagram which shows an example of obtaining the abnormality occurrence period by the abnormality determination unit 212.

Figure 8:
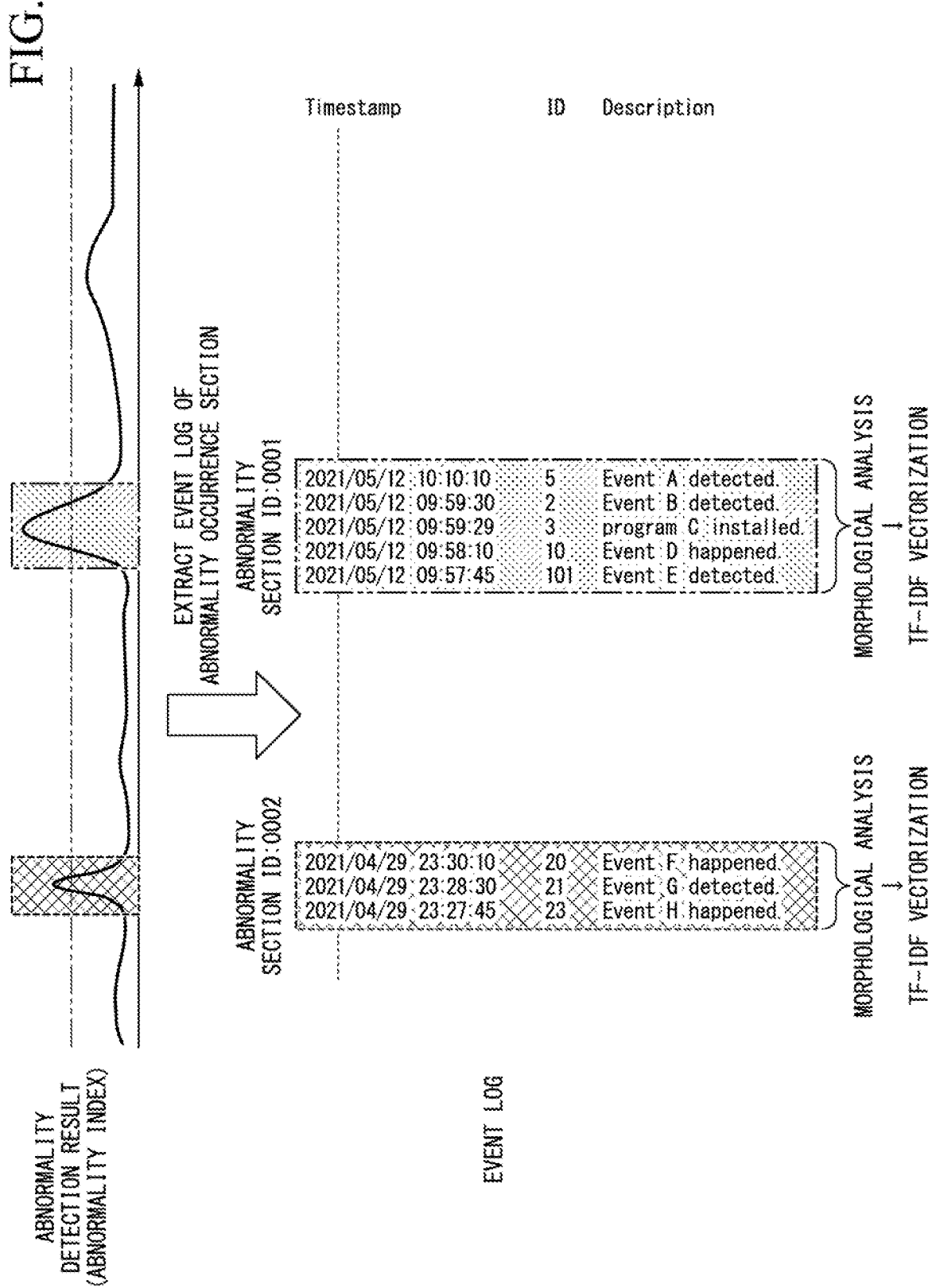
FIG. 8 is a diagram which shows an image of TF-IDF vector calculation by the operation management system according to one example embodiment of the present disclosure.

The preprocessing unit 213 extracts the event logs of the abnormality occurrence period according to the event logs acquired in step S100 (S104). In addition, the preprocessing unit 213 applies the morphological analysis to the extracted event logs, and divides them into vocabularies for each part of speech and each number representing an error (S105). The feature extraction unit 214 calculates a TF-IDF vector based on a part or all of the division (S106). FIG. 8 is a diagram which shows an image of the TF-IDF vector calculated by the feature extraction unit 214 based on the morphological analysis by the preprocessing unit 213. The model generation unit 215 records the abnormality occurrence period, the index, and the TF-IDF vector as the learning model 216 in the model storage unit 217 (S107).

Figure 4:
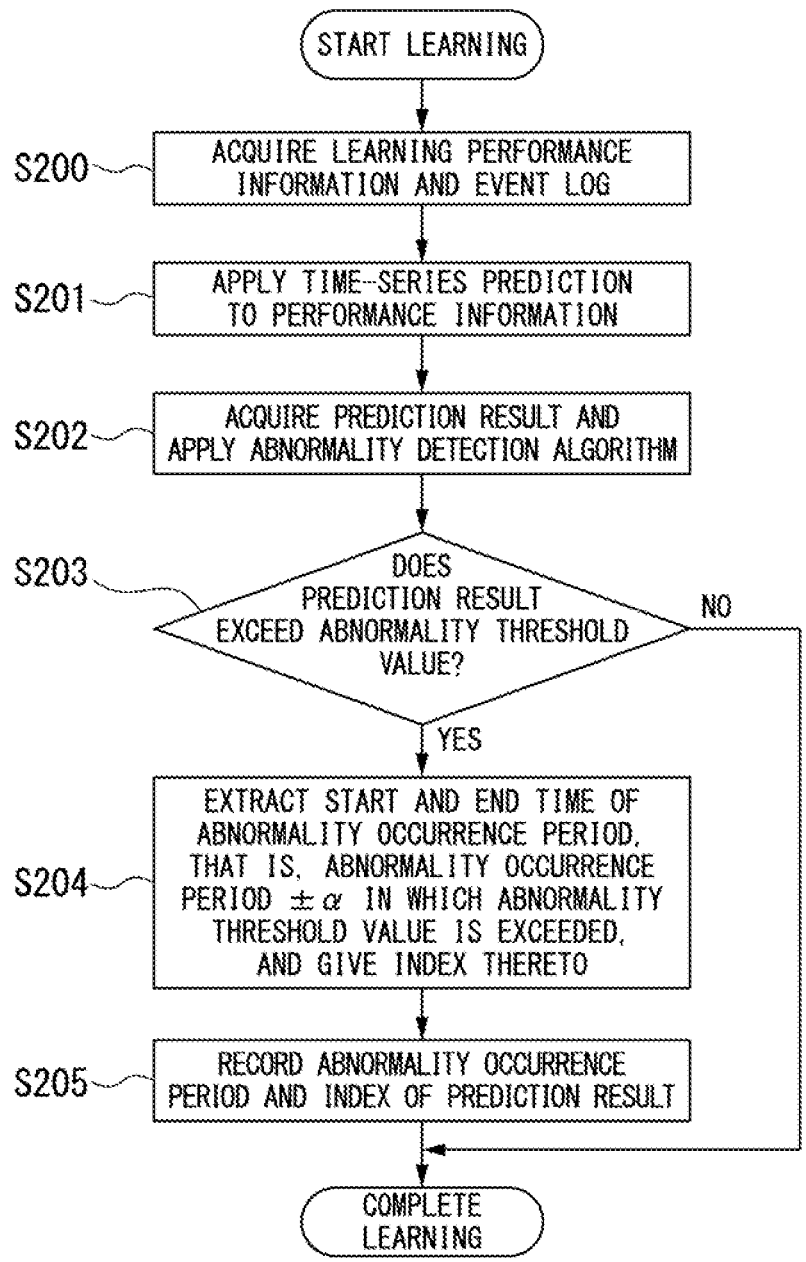
FIG. 4 is a flowchart which shows an example of an operation in a second learning method of the operation management system according to one example embodiment of the present disclosure.

Next, an operation of the learning unit 200 for the second learning method performed by the operation management system 10 will be described using FIG. 4. The learning unit 200 acquires the performance information and event logs from the log information storage unit 210 (S200). The time-series prediction unit 220 applies the time-series predicting algorithm for time-series data to the read performance information to acquire a prediction result (S201). The time-series predicting algorithm for time-series data may be autoregression, a moving average, an autoregressive moving average, a seasonal autoregressive integrated moving average, vector autoregression, a state-space, a neural network such as LSTM, or any one of ensemble methods of various algorithms. For example, as shown in an upper part of FIG. 9, the time-series prediction unit 220 uses performance information on a learning period to acquire a prediction result of changes in performance information of a period corresponding to the prediction period in FIG. 9 as predicted data (broken line indicated by a reference numeral 9a).

The time-series abnormality detection unit 221 applies the time-series data abnormality detection algorithm to performance information indicated by the predicted data and acquires an abnormality index (S202). The abnormality determination unit 222 uses the abnormality threshold value and determines whether the abnormality index of the predicted data exceeds the abnormality threshold value (S203). When the abnormality index of the predicted data exceeds the abnormality threshold value (Yes in S203), the abnormality determination unit 222 extracts an abnormality occurrence period (an abnormality occurrence period corresponding to the abnormality index indicated by 9c and 9d of FIG. 9) including a period in which the abnormality index of the predicted data exceeds the abnormality threshold value, and records it in the abnormality period storage unit 223 by giving an index thereto (S205). As in the first learning method, the abnormality occurrence period is a slightly wider period than the period in which the abnormality index exceeding the abnormality threshold value occurs, and may also be, for example, a period having a width of a with respect to each of the start time and the end time of the period in which the abnormality index exceeds the abnormality threshold value.

Next, processing of generating recommendations in the operation management system 10 will be described. The recommendation section 300 has two recommendation methods as described above, and realizes a recommendation by combining respective recommendation information.

An operation of the recommendation section 300 for the first recommendation method performed by the operation management system 10 will be described with reference to steps S500, S110, and S510 to S516 of FIG. 5. The log reading unit 301 of the recommendation section 300 acquires new performance information and event logs that are received (S500). Next, in the same manner as the first learning method shown in steps S101 to S106 in FIG. 3, the time-series abnormality detection unit 302, the abnormality determination unit 303, the preprocessing unit 304, and the feature extraction unit 305 calculate abnormality detection and an abnormality occurrence period according to the newly acquired performance information, and calculate a TF-IDF vector according to event logs in the new abnormality occurrence period (S110 in FIG. 5). Reference numerals 10a, 10b, and 10c in FIG. 10 indicate the newly acquired performance information, calculation of the abnormality index and the abnormality occurrence period, and a TF-IDF vectorized image.

The analysis unit 306 reads out the learning model 216 created at the time of learning from the model storage unit 217 (S510). In addition, the analysis unit 306 calculates a degree of similarity between the TF-IDF vector of event logs in the abnormality occurrence period obtained based on the new performance information and the TF-IDF vector read from the learning model 216 using the method such as cosine similarity (S512). The analysis unit 306 acquires index information from the TF-IDF vector having a high degree of similarity with that of the learning model 216, and generates the similarity result as recommendation information for the abnormality occurrence period and events in the period (S513). The reference numeral 10d in FIG. shows an example of an image of similarity calculation between the TF-IDF vector of the event logs in the abnormality occurrence period obtained based on the new performance information and each of TF-IDF vectors read from the learning model 216. It is determined whether the degree of similarity is high or low by, for example, comparing the degree of similarity with a predetermined threshold value. Note that the predetermined threshold value may be the same when the degree of similarity is determined to be high and to be low, and may also be set to different threshold values depending on whether the degree of similarity is determined to be high or to be low.

In addition, when the degree of similarity with the learning model 216 is low, the analysis unit 306 extracts event logs corresponding to a newly obtained abnormality occurrence period that is not similar to that of the learning model 216, and generates the recommendation information 1 in association with an event where a new event has been occurred (S513).

In addition, the analysis unit 306 extracts an abnormality occurrence period of the past index information having a high degree of similarity with respect to index information based on the newly obtained performance information, and calculates a time difference between a plurality of obtained abnormality occurrence periods (S514). The analysis unit 306 determines whether there is regularity in each time difference (for example, approximately every day, every week, or the like), and, when there is regularity, it determines whether there is a break of regularity (S515). Here, the break of regularity means that, in each time difference, some differences are larger than others, or the difference gradually spreads. When the analysis unit 306 determines that there is a break of regularity (Yes in S515), there is a possibility of an incident such as an omission of execution or a delay in processing in regular operation, and thus the recommendation information 1 is additionally updated in association with an abnormality occurrence period and a corresponding event (S516).

Figure 5:
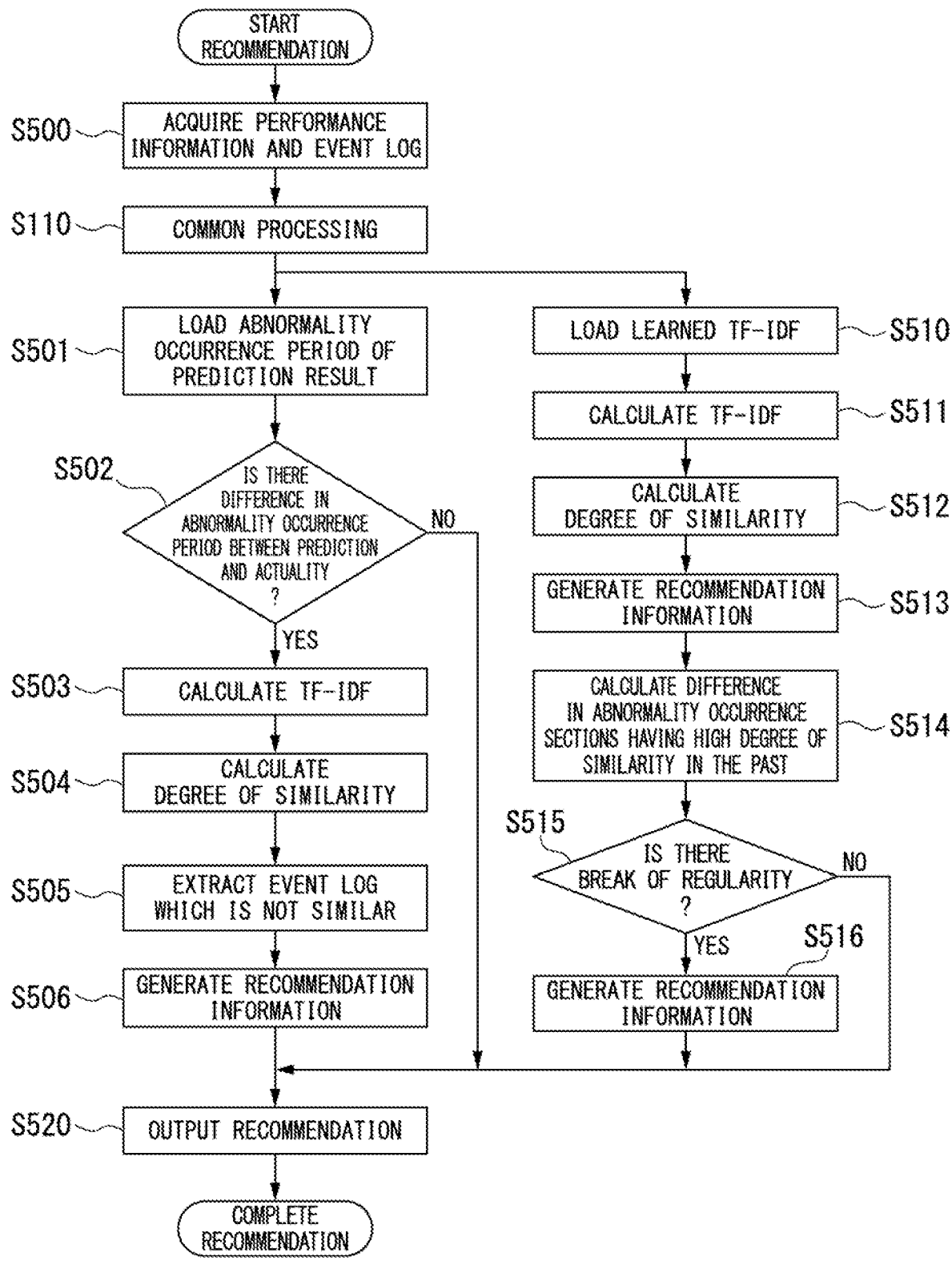
FIG. 5 is a flowchart which shows an example of an operation in generating recommendation information of the operation management system according to one example embodiment of the present disclosure.
Figure 9:
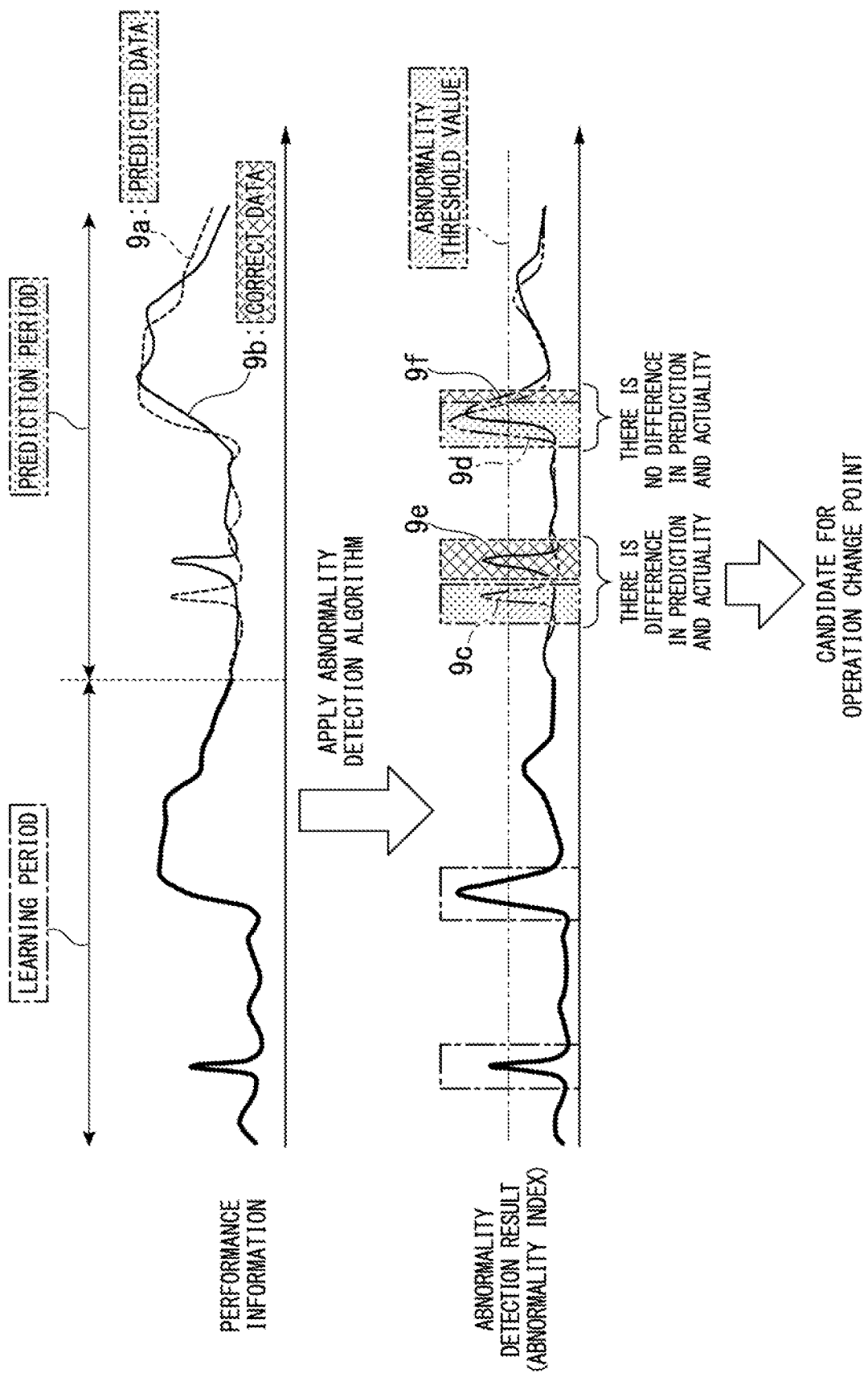
FIG. 9 is a diagram showing an image of extraction of operation change point candidates by the operation management system according to one example embodiment of the present disclosure.
Figure 10:
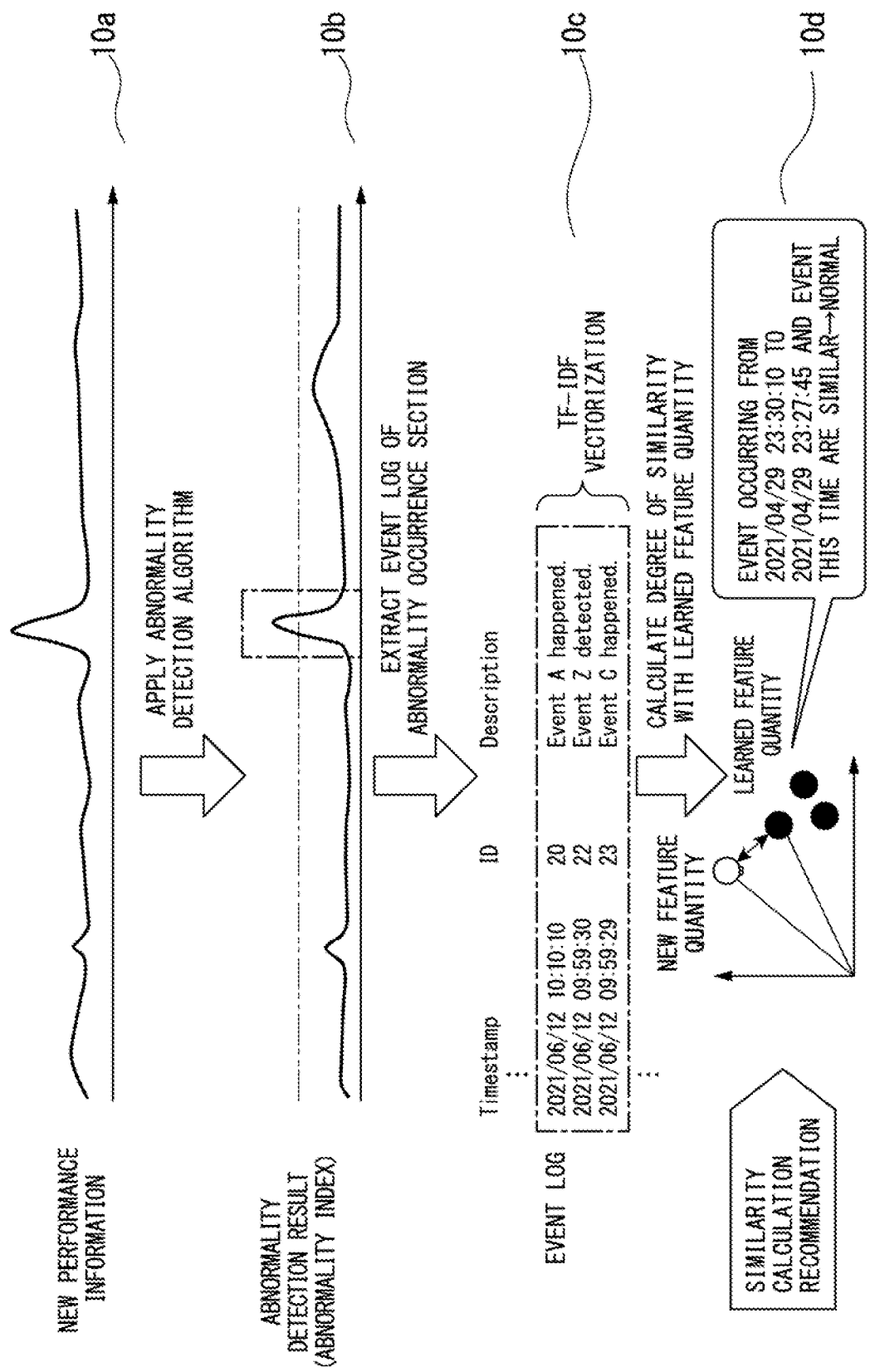
FIG. 10 is a diagram which shows an image of similarity calculation by the operation management system according to one example embodiment of the present disclosure.

The second recommendation method is executed by steps S500, S110, and S501 to S506 in FIG. 5. However, since S500 and S110 in FIG. 5 are the same as the operations in the first recommendation method, an operation shown after step S501 will be described. The analysis unit 306 acquires an abnormality occurrence period and an index which are prediction results at the time of learning from the abnormality period storage unit 223 (S501). In this processing, the analysis unit 306 acquires, for example, abnormality occurrence periods and indices corresponding to reference numerals 9c and 9d in FIG. 9. The analysis unit 306 determines whether there is a difference between the abnormality occurrence period in the newly acquired performance information and the abnormality occurrence period based on the prediction result in the same time period (S502). For example, a difference is obtained by comparing between the abnormality occurrence period in the newly acquired performance information indicated by reference numerals 9e and 9f in FIG. 9 and the abnormality occurrence period based on the prediction results corresponding to the reference numerals 9c and 9d. FIG. 9 shows an example in which it is determined that there is a difference between the abnormality occurrence period in the newly acquired performance information indicated by a reference numeral 9e and the abnormality occurrence period based on the prediction result corresponding to a reference numeral 9c. On the other hand, an example in which it is determined that there is no difference between the abnormality occurrence period in the newly acquired performance information indicated by a reference numeral 9f in FIG. 9 and the abnormality occurrence period based on the prediction result corresponding to a reference numeral 9d is shown. Whether there is a difference can be determined, for example, by determining whether there is an overlapping period in the two abnormality occurrence periods to be compared, or by using a ratio of the overlapping period to a total overlapping period of the two abnormality occurrence periods. In FIG. 9, a reference numeral 9b exemplifies correct data indicating time-series changes in actual performance information with respect to the predicted data.

When the analysis unit 306 determines that there is a difference in the comparison between the abnormality occurrence period in the newly acquired performance information and the abnormality occurrence period of the prediction result in the same time period (Yes in S502), the analysis unit 306 further calculates a TF-IDF vector of event logs in the abnormality occurrence period (S503). Note that the analysis unit 306 may use the preprocessing unit 304 and the feature extraction unit 305 to calculate a TF-IDF vector of event logs in the abnormality occurrence period of the prediction result. Subsequently, the analysis unit 306 calculates a degree of similarity based on the TF-IDF vectors of each of current and predicted event logs in a method such as cosine similarity (S504). The analysis unit 306 acquires relevant event log information by combining similar results for those with a high degree of similarity, and generates recommendation information 2, which implies that there may have been a change in an execution timing of these events, in association with a target abnormality occurrence period and events during that period (S506).

On the other hand, when it is determined that a degree of similarity is low, the analysis unit 306 extracts event logs corresponding to the abnormality occurrence period in the new performance information, and generates the recommendation information 2 implying that an occurrence of the new event may have had some effect on business processing performance in association with the abnormality occurrence period and events during that period (S506).

After execution of the first and second recommendation methods, the analysis result output unit 307 combines the recommendation information 1 and the recommendation information 2, and outputs recommendation results for an abnormality occurrence period in which there is a possibility of an incident and events during that period, which need to be checked (S520). In addition, the operation management system 10 transmits the recommendation result to the site 20 or the terminal 40.

Figure 6:
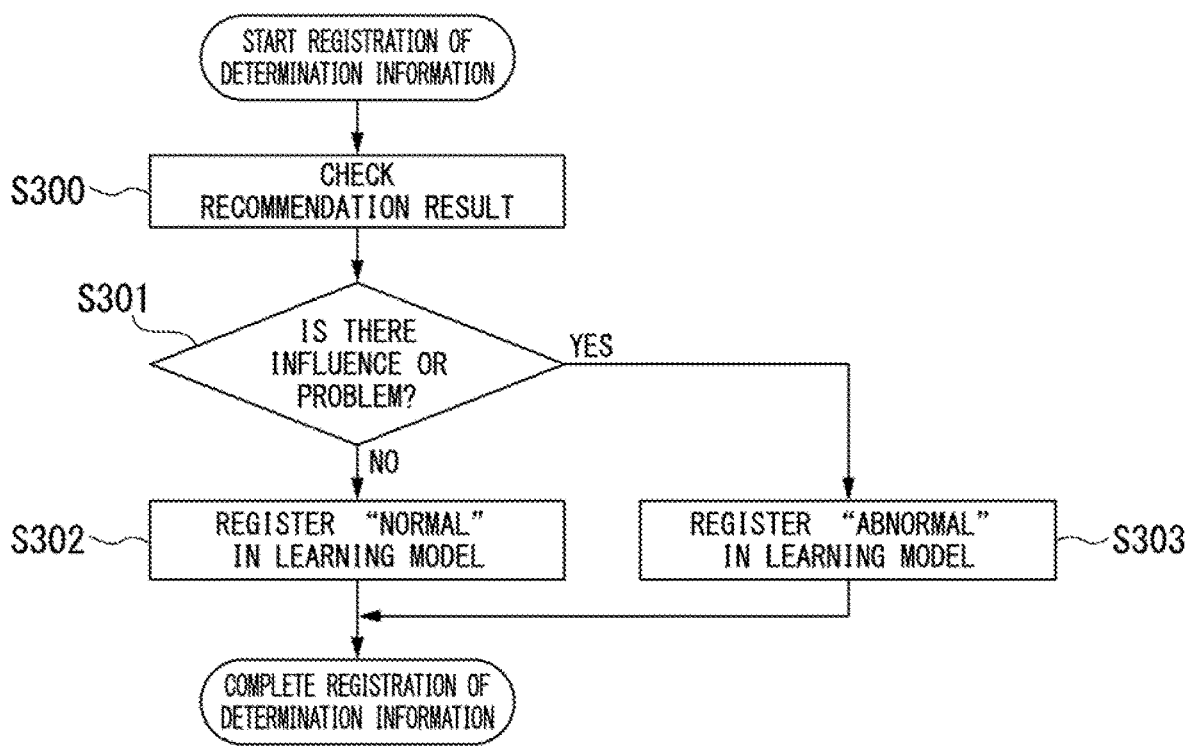
FIG. 6 is a flowchart which shows an example of an operation related to processing of feedback information for recommendations by the operation management system according to one example embodiment of the present disclosure.

Next, an operation of the operation management system 10 regarding processing of feedback information from the operation manager of the site 20 with respect to the recommendation results will be described with reference to FIG. 6. The operation management system 10 receives feedback information from the manager via the terminal or the like (S300). The feedback information is information that indicates a result checked by the operation manager for the recommendation results for the extracted abnormality occurrence period and the events during that period, and indicates whether there is any influence on the system operation or whether there is a problem occurring. When the received feedback information indicates that there is a problem (Yes in S301), the operation management system 10 registers information called "abnormal" in association with an abnormality occurrence period and the like of a learning model corresponding to the feedback information stored in the model storage unit 217. When there is no problem (No in S301), it registers the information called "normal" in association with the abnormality occurrence period and the like of the learning model corresponding to the feedback information stored in the model storage unit 217. The operation management system 10 with the system configuration described above executes learning and recommendation and registers presence or absence of a problem, thereby presenting a potential incident at an early stage. In addition, it will also be possible to present candidates for operation change points. The operation management system 10 may be configured in advance to transmit a recommendation result only when an event similar to a period determined to have an abnormality in the past has occurred. Alternatively, the operation management system 10 may be set by the operation manager such that it transmits a recommendation result only when an event similar to a period determined to have an abnormality in the past has occurred. As a result, the recommendation section 300 of the operation management system 10 transmits a recommendation result when an abnormal period in which the information called "abnormal" in S303 of FIG. 6 is determined to be similar in a flow of FIG. 5, and does not perform recommendation when an abnormal period in which the information called "normal" is registered in S302 of FIG. 6 is determined to be similar in the flow of FIG. 5. As a result, the operation manager can only check the recommendation results that are considered to be "abnormal," and as a result, a burden of checking the recommendation results and processing the feedback information can be reduced.

In the description above, learning by the learning unit 200 is performed at any time for each predetermined period in response to a storage of log information.

In addition, the recommendation section 300 may perform processing using feedback information registered in association with the extracted abnormality occurrence period or the like. For example, when information called "normal" is registered in a learning model corresponding to the extracted abnormality occurrence period, the recommendation section 300 may perform processing of excluding it from a recommendation object.

In the recommendation processing of FIG. 5, steps S500, S100, and steps S510 to S516 are described as the first recommendation method, and steps S500, S100, and steps S502 to S506 are described as the second recommendation method. In this processing, since steps S500 and S100 overlap, when steps S500 and S100 are executed in either the first recommendation method or the second recommendation method, steps S500 and S100 may be omitted at the time of executing other recommendation methods. Moreover, although it is described that the operation management system 10 has a function of executing the first recommendation method and the second recommendation method, it may have only a function of executing one of the recommendation methods.

Figure 11:
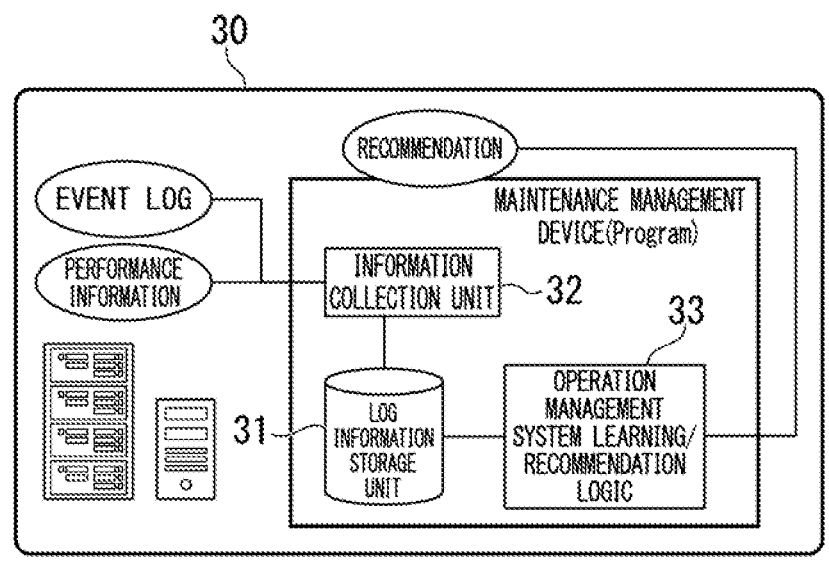
FIG. 11 is a block diagram which shows another configuration of the operation management system according to one example embodiment of the present disclosure.

In addition, in FIG. 1, the maintenance management device 21 installed in the site 20 and the operation management system 10 installed outside the site 20 are described as separate devices (systems), but the present disclosure is not limited thereto. For example, two devices may be installed in the site 20, or one device having functions of both of two devices (systems) may be installed in the site 20 as shown in FIG. 11.

In addition, the operation management system 10 may delete the log information stored in the log information storage unit 210 after learning. As a result, the operation management system 10 can perform similarity analysis using only a log feature quantity such as an abnormality occurrence period, an index, and a TF-IDF vector without storing all log information, so that it is also possible to reduce an amount of information held at an operation center.

As described above, the operation management system 10 uses event log data to output recommendation information according to calculation, thereby eliminating subjectivity and variations in notation and improving the accuracy of feature quantity extraction. In addition, by using an abnormality detection algorithm for time-series data, it is possible to make learning of normal data unnecessary.

In addition, according to the abnormality detection algorithm on time-series data of resource usage, outliers, change points, and abnormal parts are detected, and an identification determination with a past occurrence event is performed based on a degree of similarity of an event log feature quantity in the abnormality occurrence period, and thereby it is possible to easily determine whether there is a problem with a resource fluctuation factor and to easily generate a new event.

The operation management system 10 uses prediction of time-series data. For this reason, it is possible to imply a possibility of occurrence of potential incidents according to a result of abnormality detection for the prediction. In addition, if there is a difference between the prediction and actuality, it is possible to imply an occurrence of an operation change point based on a difference in event log between the prediction and the actuality.

In addition, since the operation management system 10 applies the abnormality detection algorithm for time-series data, there is no need to learn normal data, or the like, and it is possible to autonomously improve an incident management level by operating while utilizing feedback information.

As described above, in system operation management, it is possible to detect potential incidents at an early stage and detect operation change points in a system operation, and it is possible to learn and advance a level of incident management by operating the system, so that a reliability of the computer system can be autonomously improved.

Figure 12:
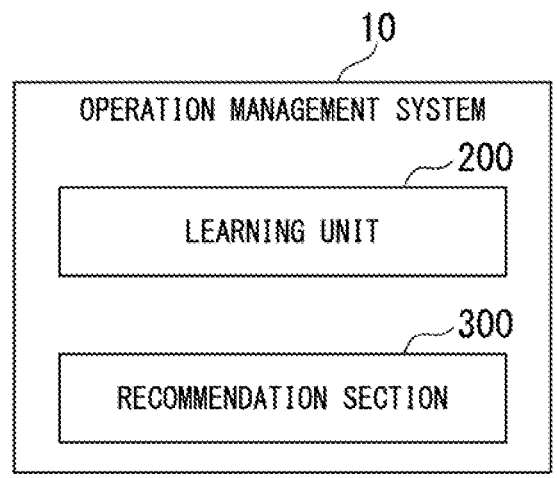
FIG. 12 is a diagram which shows a minimum configuration diagram of the operation management system according to one example embodiment of the present disclosure.

FIG. 12 is a diagram which shows a minimum configuration diagram of an operation management system according to one example embodiment of the present disclosure. The operation management system 10 includes at least a learning unit 200 and a recommendation section 300. According to performance information and event logs of a device to be managed, the learning unit 200 extracts a first abnormality occurrence period using the performance information, calculates a first TF-IDF vector created using the event logs in the first abnormality occurrence period, ad stores at least the first TF-IDF vector as a learning model. Using the performance information and event logs newly acquired by the device, the recommendation section 300 calculates a second abnormality occurrence period and a second TF-IDF vector, calculates a first degree of similarity between the first TF-IDF vector and the second TF-IDF vector, and outputs recommendation information regarding the calculated second abnormality occurrence period when the first degree of similarity is equal to or less than a predetermined value.

The operation management of a device to be operated and monitored may also be performed by recording a program for realizing functions of the processing units in FIG. 1 in a computer-readable storage medium, reading the program recorded in this storage medium into a computer system, and executing it. The "computer system" used herein includes an OS or hardware such as peripheral devices. In addition, it is assumed that the "computer system" includes a WWW system including a homepage provision environment (or display environment). Moreover, the "computer-readable storage medium" refers to a portable medium such as a flexible disk, a magneto-optical disc, a ROM, or a CD-ROM, and a storage device such as a hard disk embedded in the computer system. Furthermore, it is assumed that the "computer-readable storage medium" includes devices that hold a program for a certain period of time, like a volatile memory (RAM) inside the computer system that serves as a server or client when a program is transmitted via a network such as the Internet or a communication line such as a telephone line.

In addition, the program described above may be transmitted from a computer system storing this program in a storage device or the like to another computer system via a transmission medium or by transmission waves in a transmission medium. Here, the "transmission medium" for transmitting the program refers to a medium having a function of transmitting information, like a network such as the Internet or a communication line such as a telephone line. In addition, the program described above may be for realizing a part of the functions described above. Furthermore, it may be a so-called difference file (difference program) that can realize the functions described above in combination with a program already recorded in the computer system.

Although the example embodiment of the present disclosure has been described above, the present example embodiment is shown as an example and is not intended to limit the scope of the present disclosure. The present example embodiment can be implemented in various other forms, and various omissions, replacements, and modifications can be made within a range not departing from the gist of the present disclosure.

A part or all of the example embodiment described above may also be described in the following supplementary notes, but are not limited to the following.

(Supplementary Note 1)

An operation management system includes:
a memory configured to store instructions; and
a processor configured to execute the instructions to:
extract, according to performance information and event logs of a device to be managed, a first abnormality occurrence period using the performance information, calculate a first term frequency-inverse document frequency vector created using event logs in the first abnormality occurrence period, and store at least the first term frequency-inverse document frequency vector as a learning model; and
calculate, using the performance information and event logs newly acquired by the device, a second abnormality occurrence period and a second term frequency-inverse document frequency vector, calculate a first degree of similarity between the first term frequency-inverse document frequency vector in the learning model and the second term frequency-inverse document frequency vector, and output recommendation information regarding the calculated second abnormality occurrence period when the first degree of similarity is equal to or less than a predetermined value.

(Supplementary Note 2)

The operation management system according to supplementary note 1, in which the processor is configured to execute the instructions to extract, according to the stored performance information and event logs of the device, a third abnormality occurrence period in which a degree of similarity in abnormality is equal to or greater than a predetermined value, and, when there is a disturbance of regularity in the third abnormality occurrence period, output recommendation information regarding an abnormality occurrence period corresponding to the disturbance of regularity.

(Supplementary Note 3)

The operation management system according to supplementary note 1 or 2, in which the processor is configured to execute the instructions to:
  acquire, for the performance information and event logs of the device, predicted data of performance information using the performance information as learning data, extract an abnormality occurrence period of the predicted data to set the abnormality occurrence period of the predicted data as a fourth abnormality occurrence period, and store the fourth abnormality occurrence period and event logs corresponding to the fourth abnormality occurrence period; and
  calculate, when there is a predetermined difference in comparison of the second abnormality occurrence period and the fourth abnormality occurrence period, a fourth term frequency-inverse document frequency vector according to the event logs corresponding to the fourth abnormality occurrence period, calculate a second degree of similarity between the second term frequency-inverse document frequency vector and the fourth term frequency-inverse document frequency vector, and output recommendation information regarding the second abnormality occurrence period when the second degree of similarity is equal to or greater than a predetermined value.

(Supplementary Note 4)

The operation management system according to supplementary note 3, in which the processor is configured to execute the instructions to output the recommendation information regarding the second abnormality occurrence period when the second degree of similarity is equal to or less than a predetermined value.

(Supplementary Note 5)

The operation management system according to any one of supplementary notes 1 to 4, in which the processor is configured to execute the instructions to receive feedback information on whether there is a problem or abnormality with respect to the recommendation information, and store the feedback information in the learning model.

(Supplementary Note 6)

The operation management system according to supplementary note 3, in which the processor is configured to execute the instructions to output the recommendation information regarding the second abnormality occurrence period only when the second degree of similarity is equal to or greater than a predetermined value and there is an abnormality registered in a feedback information.

(Supplementary Note 7)

The operation management system according to any one of supplementary notes 1 to 6, in which the processor is configured to execute the instructions to:
  acquire an abnormality index by applying a time-series data abnormality detection algorithm to performance information of the device;
  extract an abnormality occurrence period when the abnormality index is equal to or greater than a predetermined value;
  provide a morphological analysis with respect to event logs of the abnormality occurrence period to divide the event logs into divisions; and
  calculate a term frequency-inverse document frequency vector using the divisions to obtain the term frequency-inverse document frequency vector.

(Supplementary Note 8)

The operation management system according to supplementary note 7, in which the abnormality occurrence period is set to a period including a period in which the abnormality index is equal to or greater than a predetermined value.

(Supplementary Note 9)

The operation management system according to any one of supplementary notes 1 to 8,
  in which the processor is configured to execute the instructions to collect performance information and event logs of the device.

(Supplementary Note 10)

An operation management method includes:
  extracting, according to performance information and event logs of a device to be managed, a first abnormality occurrence period using the performance information, calculating a first term frequency-inverse document frequency vector created using event logs in the first abnormality occurrence period, and storing at least the first term frequency-inverse document frequency vector as a learning model; and
  calculating, using the performance information and event logs newly acquired by the device, a second abnormality occurrence period and a second term frequency-inverse document frequency vector, calculating a first degree of similarity between the first term frequency-inverse document frequency vector in the learning model and the second term frequency-inverse document frequency vector, and outputting recommendation information regarding the calculated second abnormality occurrence period when the first degree of similarity is equal to or less than a predetermined value.

(Supplementary Note 11)

A non-transitory computer-readable storage medium that has recorded an operation management computer program for causing a computer to execute:
  extracting, according to performance information and event logs of a device to be managed, a first abnormality occurrence period using the performance information, calculating a first term frequency-inverse document frequency vector created using event logs in the first abnormality occurrence period, and storing at least the first term frequency-inverse document frequency vector as a learning model; and
  calculating, using the performance information and event logs newly acquired by the device, a second abnormality occurrence period and a second term frequency-inverse document frequency vector, calculating a first degree of similarity between the first term frequency-inverse document frequency vector in the learning model and the second term frequency-inverse document frequency vector, and outputting recommendation information regarding the calculated second abnormality occurrence period when the first degree of similarity is equal to or less than a predetermined value.

What is claimed is:
1. An operation management system comprising:
  one or more memories storing instructions; and
  one or more processors configured to execute the instructions to:
    successively receive, from a device to be managed, performance information and event logs of the device to be managed;

extract, according to the performance information and the event logs of the device to be managed, a first abnormality occurrence period using the performance information, calculate a first term frequency-inverse document frequency vector created using event logs in the first abnormality occurrence period, and store at least the first term frequency-inverse document frequency vector as a learning model;

calculate, using the performance information and event logs newly acquired by the device, a second abnormality occurrence period and a second term frequency-inverse document frequency vector, calculate a first degree of similarity between the first term frequency-inverse document frequency vector in the learning model and the second term frequency-inverse document frequency vector, and transmit, to a terminal of an operation manager of the device, recommendation information regarding the calculated second abnormality occurrence period when the first degree of similarity is equal to or less than a predetermined value;

acquire, for the performance information and the event logs of the device, predicted data of performance information using the performance information as learning data, extract an abnormality occurrence period of the predicted data to set the abnormality occurrence period of the predicted data as a third abnormality occurrence period, and store the third abnormality occurrence period and event logs corresponding to the third abnormality occurrence period; and calculate, when there is a predetermined difference in comparison of the second abnormality occurrence period and the third abnormality occurrence period, a third term frequency-inverse document frequency vector according to the event logs corresponding to the third abnormality occurrence period, calculate a second degree of similarity between the second term frequency-inverse document frequency vector and the third term frequency-inverse document frequency vector, and transmit, to the terminal of the operation manager of the device, recommendation information regarding the second abnormality occurrence period when the second degree of similarity is equal to or greater than a predetermined value.

2. The operation management system according to claim 1, wherein the one or more processors are configured to execute the instructions to extract, according to the stored performance information and the event logs of the device, a fourth abnormality occurrence period in which a degree of similarity in abnormality is equal to or greater than a predetermined value, and when there is a disturbance of regularity in the fourth third abnormality occurrence period, output recommendation information regarding an abnormality occurrence period corresponding to the disturbance of regularity.

3. The operation management system according to claim 1, wherein the one or more processors are configured to execute the instructions to output the recommendation information regarding the second abnormality occurrence period when the second degree of similarity is equal to or less than a predetermined value.

4. The operation management system according to claim 1, wherein the one or more processors are configured to execute the instructions to receive feedback information on whether there is a problem or abnormality with respect to the recommendation information, and store the feedback information in the learning model.

5. The operation management system according to claim 1, wherein the one or more processors are configured to execute the instructions to output the recommendation information regarding the second abnormality occurrence period only when the second degree of similarity is equal to or greater than a predetermined value and there is an abnormality registered in a feedback information.

6. The operation management system according to claim 1, wherein the one or more processors are configured to execute the instructions to:
acquire an abnormality index by applying a time-series data abnormality detection algorithm to the performance information of the device;
extract an abnormality occurrence period when the abnormality index is equal to or greater than a predetermined value;
provide a morphological analysis with respect to event logs of the abnormality occurrence period to divide the event logs into divisions; and
calculate a term frequency-inverse document frequency vector using the divisions to obtain the term frequency-inverse document frequency vector.

7. The operation management system according to claim 6, wherein the abnormality occurrence period is set to a period including a period in which the abnormality index is equal to or greater than a predetermined value.

8. The operation management system according to claim 1, wherein the one or more processors are configured to execute the instructions to collect the performance information and the event logs of the device.

9. An operation management method comprising:
successively receiving, from a device to be managed, performance information and event logs of the device to be managed;
extracting, according to the performance information and the event logs of the device to be managed, a first abnormality occurrence period using the performance information, calculating a first term frequency-inverse document frequency vector created using event logs in the first abnormality occurrence period, and storing at least the first term frequency-inverse document frequency vector as a learning model;
calculating, using the performance information and event logs newly acquired by the device, a second abnormality occurrence period and a second term frequency-inverse document frequency vector, calculating a first degree of similarity between the first term frequency-inverse document frequency vector in the learning model and the second term frequency-inverse document frequency vector, and transmitting, to a terminal of an operation manager of the device, recommendation information regarding the calculated second abnormality occurrence period when the first degree of similarity is equal to or less than a predetermined value;
acquiring, for the performance information and the event logs of the device, predicted data of performance information using the performance information as learning data, extracting an abnormality occurrence period of the predicted data to set the abnormality occurrence period of the predicted data as a third abnormality occurrence period, and storing the third abnormality occurrence period and event logs corresponding to the third abnormality occurrence period; and calculating, when there is a predetermined difference in comparison of the second abnormality occurrence period and the third abnormality occurrence period, a third term frequency-inverse document frequency vector according to the event logs corresponding to the third abnormality occurrence period, calculating a second degree of similarity between the second term frequency-inverse document frequency vector and the third term frequency-inverse document frequency vector, and transmitting, to the terminal of the operation manager of the device, recommendation information regarding the second abnormality occurrence period when the second degree of similarity is equal to or greater than a predetermined value.

10. A non-transitory computer-readable storage medium that has recorded an operation management computer program for causing a computer to execute:

successively receiving, from a device to be managed, performance information and event logs of the device to be managed;

extracting, according to the performance information and the event logs of the device to be managed, a first abnormality occurrence period using the performance information, calculating a first term frequency-inverse document frequency vector created using event logs in the first abnormality occurrence period, and storing at least the first term frequency-inverse document frequency vector as a learning model;

calculating, using the performance information and event logs newly acquired by the device, a second abnormality occurrence period and a second term frequency-inverse document frequency vector, calculating a first degree of similarity between the first term frequency-inverse document frequency vector in the learning model and the second term frequency-inverse document frequency vector, and transmitting, to a terminal of an operation manager of the device, recommendation information regarding the calculated second abnormality occurrence period when the first degree of similarity is equal to or less than a predetermined value;

acquiring, for the performance information and the event logs of the device, predicted data of performance information using the performance information as learning data, extracting an abnormality occurrence period of the predicted data to set the abnormality occurrence period of the predicted data as a third abnormality occurrence period, and storing the third abnormality occurrence period and event logs corresponding to the third abnormality occurrence period; and calculating, when there is a predetermined difference in comparison of the second abnormality occurrence period and the third abnormality occurrence period, a third term frequency-inverse document frequency vector according to the event logs corresponding to the third abnormality occurrence period, calculating a second degree of similarity between the second term frequency-inverse document frequency vector and the third term frequency-inverse document frequency vector, and transmitting, to the terminal of the operation manager of the device, recommendation information regarding the second abnormality occurrence period when the second degree of similarity is equal to or greater than a predetermined value.

\* \* \* \* \*